(12) United States Patent
Dobrenko et al.

(10) Patent No.: US 9,647,570 B2
(45) Date of Patent: May 9, 2017

(54) PHOTOVOLTAIC SYSTEM AND METHOD OF OPERATION

(71) Applicant: Sunways AG Photovoltaic Technology, Constance (DE)

(72) Inventors: Alexey Dobrenko, Constance (DE); Marco Schilli, Constance (DE)

(73) Assignee: RCT Power GmbH, Constance (DE)

( * ) Notice: Subject to any disclaimer, the term of this patent is extended or adjusted under 35 U.S.C. 154(b) by 265 days.

(21) Appl. No.: 14/384,829

(22) PCT Filed: Mar. 8, 2013

(86) PCT No.: PCT/EP2013/054735
§ 371 (c)(1),
(2) Date: Sep. 12, 2014

(87) PCT Pub. No.: WO2013/135578
PCT Pub. Date: Sep. 19, 2013

(65) Prior Publication Data
US 2015/0062990 A1    Mar. 5, 2015

(30) Foreign Application Priority Data

Mar. 12, 2012    (DE) .................. 10 2012 203 836

(51) Int. Cl.
*H02M 7/44*    (2006.01)
*H02J 3/38*    (2006.01)
(Continued)

(52) U.S. Cl.
CPC .............. *H02M 7/44* (2013.01); *H02J 3/383* (2013.01); *H02M 7/42* (2013.01); *H02M 11/00* (2013.01);
(Continued)

(58) Field of Classification Search
CPC . H02M 2001/0022; H02M 7/42; H02M 11/00
See application file for complete search history.

(56) References Cited

U.S. PATENT DOCUMENTS 5,450,306 A * 9/1995 Garces .................. H02M 5/458
363/132
2005/0105224 A1    5/2005 Nishi
(Continued)

FOREIGN PATENT DOCUMENTS

CN    102195287 A    9/2011
CN    102332842 A    1/2012
(Continued)

OTHER PUBLICATIONS

First Office Action, including Search Report, for Chinese Patent Application No. 201380014185.5, dated May 20, 2016, 20 pages.
(Continued)

*Primary Examiner* — Jue Zhang
*Assistant Examiner* — Lakaisha Jackson
(74) *Attorney, Agent, or Firm* — Westman, Champlin & Koehler, P.A.

(57) ABSTRACT

The present invention relates to a circuit arrangement for electrical installations for converting and adapting a DC voltage of a voltage source, more particularly for a solar inverter of a photovoltaic installation, having an electrical output, which can be coupled to an inverter, wherein, at the electrical output, a potential in a positive branch of an intermediate circuit of the electrical installation can be increased in such a way that an output potential of a negative pole of the voltage source assumes a value greater than the potential of the negative pole before the increase, or the potential in a negative branch of the intermediate circuit of the electrical installation can be reduced in such a way that an output potential of a positive pole of the voltage source assumes a value lower than the potential of the positive pole (Continued)

before the reduction, and having a compensation device designed for compensating for the electrical power between the positive branch of the intermediate circuit of the electrical installation and the negative branch of the intermediate circuit of the electrical installation during the operation of the circuit arrangement. The present invention furthermore relates to a method and a photovoltaic installation.

14 Claims, 2 Drawing Sheets

(51) Int. Cl.
- *H02M 1/00* (2006.01)
- *H02M 7/42* (2006.01)
- *H02M 11/00* (2006.01)

(52) U.S. Cl.
CPC .... *H02M 2001/0022* (2013.01); *Y02E 10/563* (2013.01)

(56) References Cited

U.S. PATENT DOCUMENTS

| | | | |
|---|---|---|---|
| 2009/0101191 A1 | 4/2009 | Beck et al. | |
| 2009/0195079 A1 | 8/2009 | Barrenscheen | |
| 2013/0121029 A1* | 5/2013 | Coors | H02J 3/383 363/13 |
| 2013/0329471 A1* | 12/2013 | Escobar | H02M 7/42 363/40 |
| 2014/0029308 A1* | 1/2014 | Cojocaru | H01G 4/38 363/13 |
| 2014/0346877 A1* | 11/2014 | Fujita | H02M 5/297 307/45 |
| 2015/0280423 A1* | 10/2015 | Bremicker | H02M 1/32 307/71 |
| 2015/0295491 A1* | 10/2015 | Lenz | H02J 3/383 323/234 |
| 2015/0372615 A1* | 12/2015 | Ayyanar | H02M 1/15 363/131 |

FOREIGN PATENT DOCUMENTS

| | | |
|---|---|---|
| DE | 19526836 A1 | 1/1997 |
| DE | 10 2008 044 404 A1 | 8/2009 |
| DE | 10 2009 015 388 A1 | 9/2010 |
| DE | 10 2010 023 262 A1 | 12/2011 |
| EP | 2363947 A1 | 9/2011 |
| WO | 2008/154918 A1 | 12/2008 |
| WO | 2010/078669 A1 | 7/2010 |
| WO | 2010/108758 A1 | 9/2010 |

OTHER PUBLICATIONS

International Preliminary Report on Patentability including transmittal papers and Written Opinion for PCT Application No. PCT/EP2013/054735, dated Sep. 16, 2014, 12 pages.

International Search Report for PCT/EP2013/054735, dated Sep. 4, 2013, 6 pages.

* cited by examiner

PHOTOVOLTAIC SYSTEM AND METHOD OF OPERATION

CROSS-REFERENCE TO RELATED APPLICATION

This Application is a Section 371 National Stage Application of International Application No. PCT/EP2013/054735, filed 8 Mar. 2013 and published as WO 2013/135578 A1 on 19 Sep. 2013, in German, the contents of which are hereby incorporated by reference in their entirety.

FIELD OF THE INVENTION

The present invention relates to a circuit arrangement for electrical systems for converting and adapting a DC voltage. The present invention further relates to a method and to a photovoltaic system.

TECHNICAL BACKGROUND

Although the present invention can be applied to a large number of electrical and electronic systems, in the following said invention is described in relation to a photovoltaic system comprising a solar inverter.

Photovoltaic systems are used to obtain electrical energy from solar energy and to feed this electrical energy into a public power supply network or power grid. For this purpose, inverters are customarily used which convert the electrical direct current generated by the solar cells of the photovoltaic system into an alternating current. Said alternating current can then be fed into the utility grid.

In order to be able to feed an alternating current that is as symmetrical as possible into the utility grids, the solar cells or the strings of solar cells are for example directly coupled to the inverter. In doing so, the negative pole of the solar cell arrangement is coupled to the negative pole of the inverter and the positive pole of the solar cell arrangement is coupled to the positive pole of the inverter. The problem with connecting solar cells and inverters in this way is that in some circumstances, in the event of low solar insolation, the DC voltage generated by the solar cells turns out to be too low to generate an alternating current, by means of the inverter, that can then be fed into the utility grid. In inverter topologies having a split intermediate circuit ($U_{ZK+}$ and $U_{ZK-}$), the size of the voltage in the negative and positive intermediate circuit has to be greater than the amplitude of the mains voltage. With a 230 V mains voltage, the amplitude is 324 V. If the solar cell arrangement of a photovoltaic system generates for example a DC voltage of less than 2×324 V=648 V, the DC voltage thus obtained can no longer be converted into a 230 V AC voltage by an inverter having a split intermediate circuit.

For this reason, what are known as boost converters are used between the solar cell arrangement and the inverter and increase the amount of DC voltage generated by the solar cell arrangement. As a result, it is possible to generate and feed alternating current for a utility grid even when the solar cell arrangement supplies a lower amount of DC voltage than is required for the utility grid.

If the solar cell arrangement is connected to the inverter such that the positive pole of the solar cell arrangement has a positive potential with respect to the reference ground and the negative pole of the solar cell arrangement has a negative potential with respect to the reference ground, this can lead to a creeping performance degradation of the solar cells as a result of what is known as the PID effect. This PID effect is caused substantially by the negative potential of the negative pole of the solar cell with respect to the potential of the reference ground, which can lead to undesired leakage currents. Overall, this leads to accelerated aging and a significant performance loss of the solar cell arrangement.

In order to prevent this PID effect from occurring, electrical circuits are used which are intended to raise the voltage potential of the negative pole of the solar cell, so that said potential is equal to the potential of the reference ground or takes on a positive value with respect to the potential of the reference ground.

A corresponding circuit system is described for example in DE 10 2007 050 554 A1. If the potential of the positive pole of the solar cell is increased, the potential of the negative pole of the solar cell increases too.

SUMMARY OF THE INVENTION

Against this background, an object of the present invention is to be able to efficiently operate a photovoltaic system on a transformer-free inverter having a split intermediate circuit, with the negative pole of the solar cell having a positive or at least not negative potential with respect to the potential of the reference ground.

This object is achieved according to the invention by a circuit arrangement having the features of claim 1 and/or by a method having the features of claim 8 and/or by a photovoltaic system having the features of claim 11.

Accordingly, the following is provided:

A circuit arrangement for electrical systems for converting and adapting a DC voltage of a voltage source, in particular for a solar inverter of a photovoltaic system, comprising an electrical output, which can be coupled to an inverter, it being possible to increase a potential in a positive branch of an intermediate circuit of the electrical system at the electrical output, such that an output potential of a negative pole of the voltage source takes on a value that is greater than the potential that the negative pole has prior to the increase, or it being possible to reduce the potential in a negative branch of the intermediate circuit of the electrical system, such that an output potential of a positive pole of the voltage source takes on a value that is smaller than the potential that the positive pole has prior to the reduction, and comprising a balancing device which is designed to balance the electric power between the positive branch of the intermediate circuit of the electrical system and the negative branch of the intermediate circuit of the electrical system.

The following is also provided:

A method for operating electrical systems for converting and adapting a DC voltage of a voltage source, in particular having a circuit arrangement according to the invention, comprising the steps of: increasing a potential in a positive branch of the intermediate circuit of the electrical system such that a potential of a negative pole of the voltage source takes on a value that is greater than the potential that the negative pole has prior to the increase, or reducing the potential in a negative branch of the intermediate circuit of the electrical system such that an output potential of a positive pole of the voltage source takes on a voltage value that is smaller than the potential that the positive pole has prior to the reduction, and balancing the electric power between the positive branch of the intermediate circuit of the electrical system and the negative branch of the intermediate circuit of the electrical system.

Finally, the following is provided:

A photovoltaic system comprising a circuit arrangement according to the invention.

The present invention is based on the finding that the use of symmetrical voltages, with respect to the reference ground, in the intermediate circuit is not necessarily required to increase the efficiency of the inverter.

The present invention is based on the idea of taking this finding into account and providing a circuit arrangement which does not actually shape the potentials of the positive and negative intermediate circuit branch to be symmetrical with respect to a reference potential. Instead, by means of the circuit arrangement, the amount of electric power which is supplied to the positive DC voltage connection of the inverter is made equal to the amount of electric power that is supplied to the negative DC voltage connection of the inverter. This allows for efficient operation of the inverter even with asymmetrical input voltages of the inverter.

The circuit arrangement according to the invention comprises two operating modes. In the first operating mode, symmetrical intermediate circuit voltages are provided for the inverter. This first operating mode can for example be used with solar modules which are not subject to the PID effect. In this operating mode, a solar installation reaches maximum efficiency. If solar modules are used, however, which are subject to the PID effect (for example, thin-film solar modules) and in which the potential at the negative pole of the solar modules has to be increased as a result, the circuit arrangement is operated in the second operating mode. In this case, the circuit arrangement is operated such that the potential in the positive branch of the intermediate circuit is increased by the inverter to shape the potential at the negative pole of the solar modules to be positive with respect to the reference potential, or the potential in the negative branch of the intermediate circuit is reduced in order to shape the potential at the positive pole of the solar modules to be negative with respect to the reference potential. The potential can also match the reference potential instead of being either greater or smaller than said reference potential.

The circuit arrangement according to the invention further allows the potential of the negative intermediate circuit to be regulated such that said potential becomes asymmetrical with the potential of the positive intermediate circuit branch with respect to the reference potential. In particular, the circuit arrangement according to the invention regulates the potential of the negative intermediate circuit branch according to the mains voltage of the utility grid (e.g. 324 V). This allows semiconductor switches to be used in the circuit arrangement when the solar cells are at a voltage of e.g. 650 V, which switches have an electric strength of less than 1200 V (650 V+324 V≤1200 V).

In order to prevent a proportion of a direct current being fed into the utility grid as a result of the asymmetrical voltages in the intermediate circuit or in the reference potential, the present invention provides for a balancing device which balances the branches of the intermediate circuit in terms of electric power. Instead of using individual solar cells, the circuit arrangement can be operated by a group of solar cells, solar cells connected in series and/or in parallel, strings of solar cells or the like.

Advantageous embodiments and developments can be found in the dependent claims and from the description with reference to the figures.

In one embodiment, at least one first boost converter is provided which is designed to increase the amount of voltage between the negative and the positive pole of the voltage source of the electrical system and/or to make the amount of voltage equal to the amount of a mains voltage of a utility grid. This allows current generated by the voltage source to be fed in, even when the voltage that the voltage source provides is smaller than a mains voltage of the utility grid.

In one embodiment, the balancing device comprises an inverting adjuster which is electrically coupled to the positive branch, the negative branch and a first node point of the electrical system. This allows for the provision of a very efficient and simple balancing device.

In another embodiment, the first node point comprises a reference potential. In addition, the inverting adjuster is designed to balance the electric power in the positive branch and the negative branch with respect to the reference potential. This allows the circuit arrangement to be adapted to different reference potentials and applications. In another embodiment, a buck-boost converter or another type of DC-to-DC converter can be used instead of an inverting adjuster.

In one embodiment, the inverting adjuster is electrically arranged between the at least one first boost converter and an electrical output of the circuit arrangement. This allows electric power to be balanced between the positive branch of the intermediate circuit of the electrical system and the negative branch of the intermediate circuit of the electrical system using just one balancing device, even when a plurality of solar cells is used in the photovoltaic system. In such a case, the first boost converter can be configured as a multichannel boost converter which has at least two electrically parallel input connections for solar cells. Instead of individual solar cells, a series and/or parallel circuit of solar cells and/or at least one string of solar cells or array of solar cells can be connected to the first boost converter.

In one embodiment, the inverting adjuster comprises a controllable switch and a diode in the reverse direction which is arranged in series with said controllable switch and electrically arranged between the positive branch and the negative branch. The controllable switch can for example be a MOSFET, IGBT, JFET, a bipolar transistor or another power semiconductor.

In yet another embodiment, the inverting adjuster comprises an inductive element (a coil, inductor) which is electrically arranged between a second node point, which is connected between the controllable switch and the diode, and the first node point. This allows the inverting adjuster to be constructed in a simple, non-complex manner.

In a particularly preferred embodiment, the balancing device comprises a control device which is designed to control the inverting adjuster such that the same electric power is output at a positive output connection of the circuit arrangement as at a negative output connection of the circuit arrangement. The control device can for example contain a microprocessor or also an FGPA or a PLD. The use of such a control device allows the inverting adjuster to be controlled in a very flexible manner.

Where practical, the above embodiments and developments can be combined in any given manner. Further possible embodiments, developments and implementations of the invention also include combinations of features of the invention described above or below in relation to the embodiments, even if said combinations are not explicitly mentioned. In this context, a person skilled in the art will in particular add individual aspects as improvements or additions to the respective basic form of the present invention.

CONTENT OF THE DRAWINGS

The present invention will be described in greater detail below on the basis of the embodiments given in the schematic figures of the drawings, in which.

Figure 1:
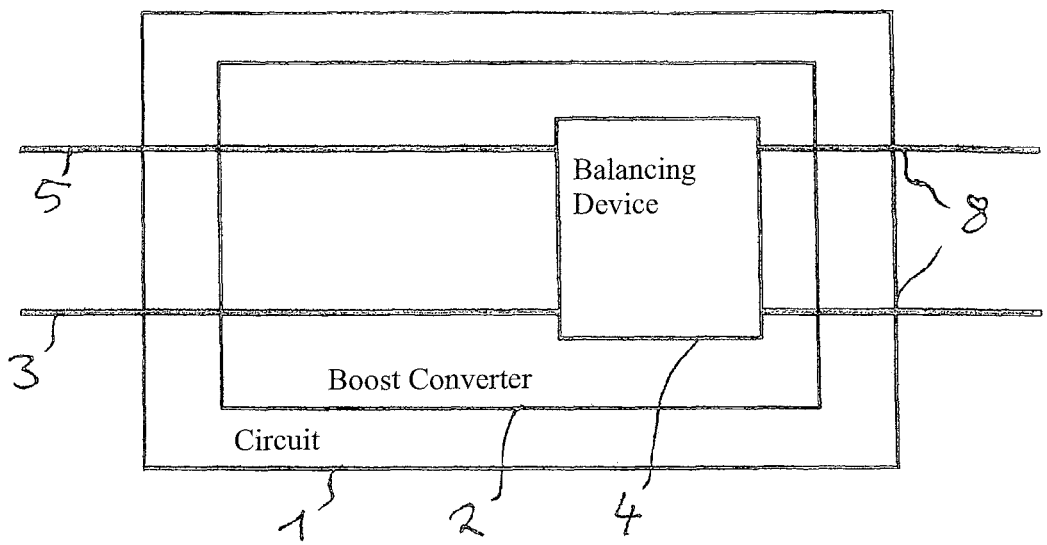
FIG. 1 is a block diagram of an embodiment of a circuit arrangement according to the invention.

The accompanying drawings are intended to give a better understanding of the embodiments of the invention. They illustrate embodiments and, in conjunction with the description, serve to explain principles and concepts of the invention. Other embodiments and many of the mentioned advantages emerge in relation to the drawings. The elements of the drawings are not necessarily shown true to scale relative to one another.

Unless otherwise stated, like elements, features and components and those having the same function or effect are provided with like reference numerals in each of the figures of the drawings.

DESCRIPTION OF EMBODIMENTS

FIG. 1 is a block diagram of a first embodiment of a circuit arrangement according to the invention. The circuit arrangement denoted by 1 comprises a balancing device 4. The balancing device 4 is coupled to a negative branch 3 and a positive branch 5 of the intermediate circuit of a photovoltaic system 24 (not shown in FIG. 1).

The circuit arrangement 1 is designed as a discrete electrical circuit arrangement 1. In further embodiments, the circuit arrangement 1 can also be designed as an integrated electronic circuit arrangement 1. In further embodiments still, the circuit arrangement 1 can also be designed as a component of an inverter 14.

In the example shown, the circuit arrangement 1 is designed for a total electric power of at most 10 kW. In further embodiments, the circuit arrangement 1 can also be designed for a total electric power of up to 1 MW, in particular also up to 100 kW or 1 KW.

In a further embodiment, the circuit arrangement 1 comprises a control device which is designed to control the balancing device 4 and, if provided, a boost converter 2 (not shown). In one embodiment, the control device is designed as a microcontroller. In further embodiments, the control device is designed as a computer program product which is executed on a microcontroller. In this context, the computer program product can be a program (piece of software) which is capable of running independently. In further embodiments, the computer program product is designed as a computer program product module which is executed as a module of an operating system.

In one embodiment, the control device comprises a plurality of sensors for detecting voltages and currents, in order to detect the currents and voltages which are provided by the individual solar cells and which occur in the negative branch 3 and the positive branch 5 of the intermediate circuit, and in order to determine the value thereof.

The control device is also designed to control the balancing device 4 such that the same electric power is output at the positive output connection of the circuit arrangement 1 as at a negative output connection of the circuit arrangement 1.

Figure 2:
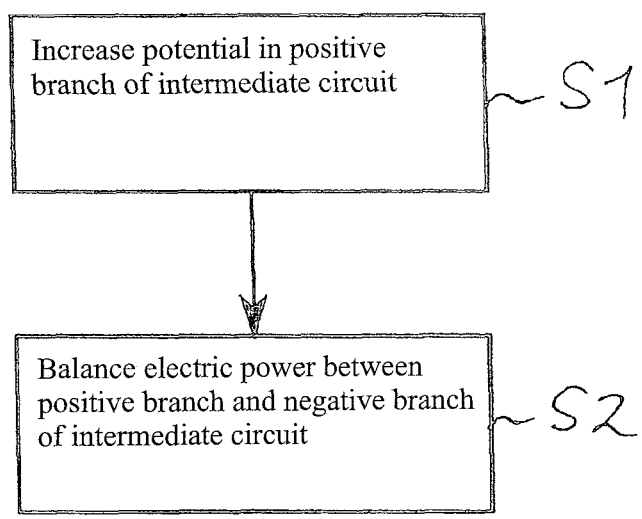
FIG. 2 is a flow chart of an embodiment of a method according to the invention.

FIG. 2 is a flow chart intended to explain an embodiment of a method according to the invention. In a first step S1, a potential in a positive branch of the intermediate circuit of the electrical system 24 is increased such that a potential of a negative pole of the voltage source 18 takes on a value which is greater than the potential that the negative pole has prior to the increase, or the potential in a negative branch of the intermediate circuit of the electrical system 24 is reduced such that an output potential of a positive pole of the voltage source 18 takes on a voltage value which is smaller than the potential that the positive pole has prior to the reduction. In a second step S2, the electric power is balanced between the positive branch 5 of the intermediate circuit of the electrical system 24 and the negative branch 3 of the intermediate circuit of the electrical system 24.

In particular, the potential of the positive branch 5 of the intermediate circuit is increased in the first step such that the potential at the negative pole of the solar cell is greater than or equal to the potential of a reference ground, for example earth. In addition, in the first step the voltage of the negative branch 3 of the intermediate circuit is made equal to the voltage of the utility grid.

In a further embodiment, the method according to the invention contains the parallel increase of the voltages provided by a plurality of solar cells.

Figure 3:
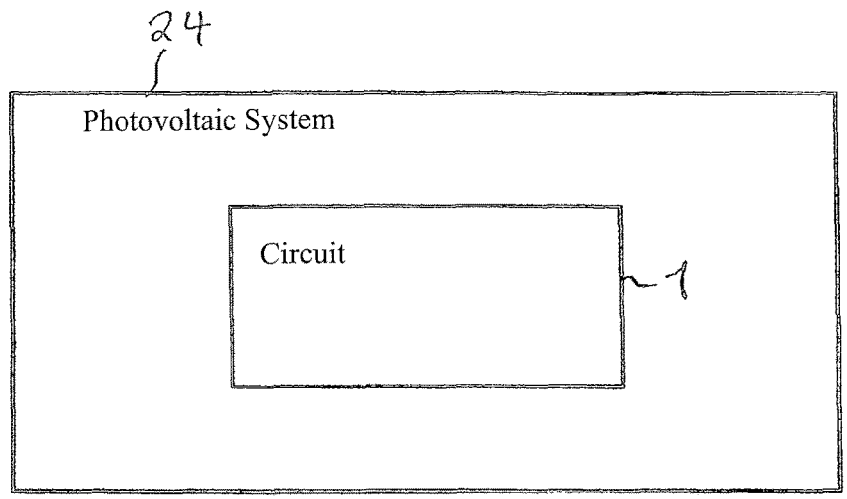
FIG. 3 is a block diagram of an embodiment of a photovoltaic system according to the invention.

FIG. 3 is a block diagram of an embodiment of a photovoltaic system 24 according to the invention. In this case, the photovoltaic system 24 comprises a circuit arrangement 1 according to the invention.

Figure 4:
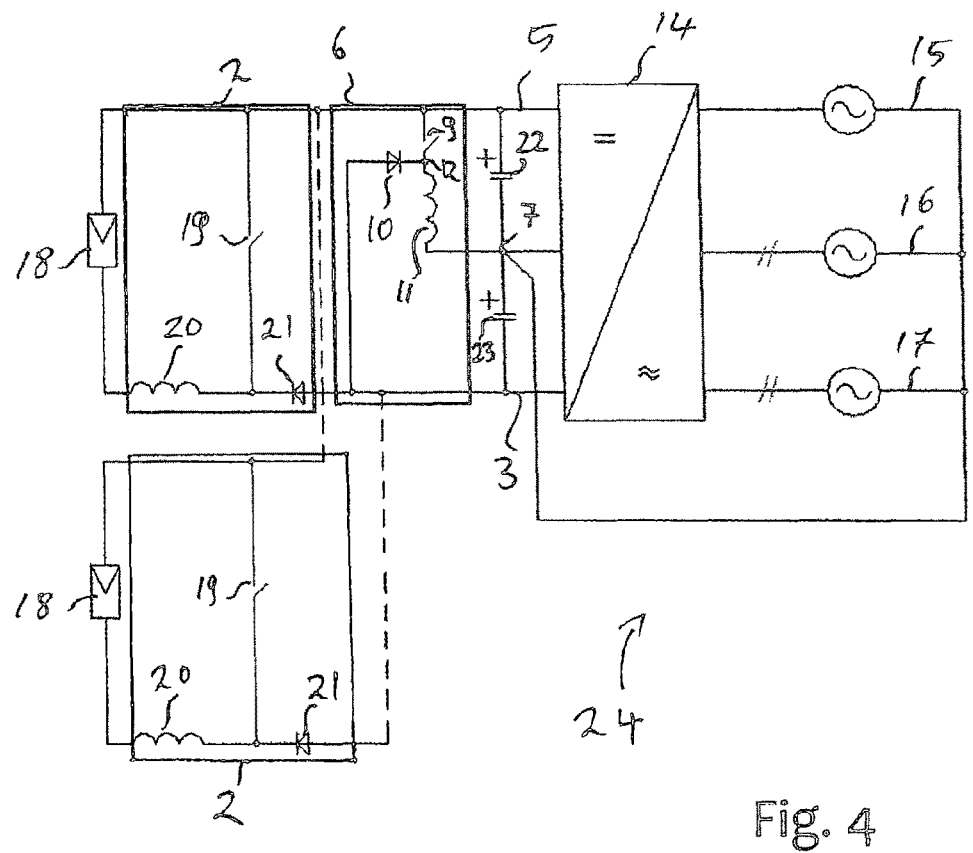
FIG. 4 is another block diagram of an embodiment of a photovoltaic system according to the invention.

FIG. 4 is another block diagram of an embodiment of a photovoltaic system 24 according to the invention. In this case, the circuitry of the photovoltaic system 24 is shown in greater detail by comparison with the embodiment of FIG. 3.

The photovoltaic system 24 in FIG. 4 comprises a solar cell 18 which is electrically coupled to a first boost converter 2. In FIG. 4, an additional solar cell 18 having its own first boost converter 2 is included in the drawing. This second and additional solar cell is provided, as shown by two connection lines which are illustrated by dashed lines and couple the second solar cell 18 and the first boost converter 2 thereof parallel with the first solar cell 18 and the first boost converter 2 thereof to the negative branch 3 and the positive branch 5 of the intermediate circuit of the photovoltaic system 24.

The first boost converter 2 can for example be a multichannel boost converter 2 which, for a plurality of solar cells 18, can adapt the output voltage for each solar cell 18 separately.

The individual arrangements of solar cells 18 and corresponding first boost converters 2 are connected in parallel. Nevertheless, one single balancing device 4 (not explicitly shown) is sufficient. The balancing device (not explicitly shown) in FIG. 4 comprises an inverting adjuster 6 and is arranged between the solar cells 18 having the corresponding boost converters 2 and the inverter 14 having the intermediate circuit capacitors 22, 23.

The inverter 14 comprises three input connections. In this case, the first intermediate circuit capacitor 22 is arranged between the positive input connection of the inverter 14 and the earth input connection of the inverter 14. The second intermediate circuit capacitor 23 is arranged between the earth input connection of the inverter 14 and the negative input connection of the inverter 14. In a further embodiment, the inverter 14 comprises just two input connections.

In addition, the inverter 14 comprises three output connections, of which each corresponds to one of the three phases 15-17 of a utility grid. The three phases 15-17 are coupled to the earth input connection of the inverter 14 at their node point via a neutral wire. The first node point 7 is also coupled to the earth input connection of the inverter 14.

In a further embodiment, the inverter 14 comprises just two output connections or one output connection. In addition, various components, such as relays, coils and the like, can also be arranged in the coupling line between the neutral wire and the reference point 7 of the circuit arrangement 1.

The first boost converters 2 shown in FIG. 4 each comprise an inductive element 20 such as a coil. The inductive element 20 is arranged between the negative pole of the corresponding solar cell 18 and a diode 21 in the reverse direction. Furthermore, a switch 19 is provided in each of the first boost converters, which switch couples the node point between the inductor 20 and the diode 21 to the positive pole of the solar cell 18 and the positive branch 5 of the intermediate circuit of the photovoltaic system 24. The switch 19 is for example a semiconductor switch, such as a MOSFET, JFET, a bipolar transistor or the like. The anode of the diode 21 is coupled to the negative branch 3 of the intermediate circuit of the photovoltaic system 24.

In FIG. 4, the balancing device 4 (not explicitly shown) comprises an inverting adjuster 6. The inverting adjuster 6 comprises a controllable switch 9 and a diode 10, in the reverse direction, which is arranged in series with said controllable switch and arranged electrically between the positive branch 5 and the negative branch 3.

In addition, the inverting adjuster 6 comprises an inductor 11, which is electrically arranged between a second node point 12, arranged between the switch 9 and the diode 10, and the first node point 7.

In a first step, the inverting adjuster, also called a buck-boost converter, removes energy from the positive intermediate circuit branch 5. In this first step, the switch 9 is closed. In a second step, the buck-boost converter transfers the removed energy to the negative branch 3 of the intermediate circuit. The switch 9 is open for this purpose.

Although the present invention has been described above on the basis of preferred embodiments, it is not limited thereto, but rather can be modified in various ways. In particular, the invention can be altered or modified in many ways without departing from the core of the invention.

LIST OF REFERENCE NUMERALS 1 circuit arrangement
2 boost converter
3 negative branch
4 balancing device
5 positive branch
6 inverting adjuster
7 node point
8 electrical output
9, 19 controllable switch
10 diode
11, 20 inductive element, coil
12 node point
14 inverter
15-17 phases
18 solar cell
21 diode
22, 23 capacitors
24 photovoltaic system
S1, S2 method steps

The invention claimed is:

1. A circuit arrangement for a photovoltaic system, the circuit arrangement comprising:
an electrical output,
a solar inverter for converting and adapting a DC voltage of a voltage source, wherein the the inverter is configured to (a) increase a potential in a positive branch of an intermediate circuit of the photovoltaic system at the electrical output, such that an output potential of a negative pole of the voltage source takes on a value that is greater than a potential that the negative pole has prior to being increased, or (b) reduce a potential in a negative branch of the intermediate circuit of the photovoltaic system, such that an output potential of a positive pole of the voltage source takes on a value that is smaller than a potential that the positive pole has prior to being reduced, and
a balancing device which is designed to balance electric power between the positive branch of the intermediate circuit of the electrical system and the negative branch of the intermediate circuit of the electrical system during operation of the circuit arrangement.

2. The circuit arrangement of claim 1, wherein at least one first boost converter is provided which is designed to increase an amount of voltage between the negative and the positive pole of the voltage source of the electrical system or to make the amount of voltage equal to an amount of a mains voltage of a utility grid.

3. The circuit arrangement of claim 1, wherein the balancing device comprises an inverting adjuster which is electrically coupled to the positive branch, the negative branch and a first node point of the electrical system.

4. The circuit arrangement of claim 3, wherein during operation of the circuit arrangement, the first node point comprises a reference potential and in that the inverting adjuster is designed to balance the electric power in the positive branch and the negative branch with respect to the reference potential.

5. The circuit arrangement of claim 3, wherein at least one first boost converter is provided which is designed to increase an amount of voltage between the negative and the positive pole of the voltage source of the electrical system or to make the amount of voltage equal to an amount of mains voltage of a utility grid, and wherein the inverting adjuster is electrically arranged between the first boost converter and an electrical output of the circuit arrangement.

6. The circuit arrangement of claim 3, wherein the inverting adjuster comprises a controllable switch and a diode, in a reverse direction, which is arranged in series with a path controlled by said switch and is electrically arranged between the positive branch and the negative branch.

7. The circuit arrangement of claim 6, wherein the inverting adjuster comprises an inductive element which is electrically arranged between a second node point, which is connected between the switch and the diode, and the first node point.

8. The circuit arrangement of claim 3, wherein the balancing device comprises a control device which is designed to control the inverting adjuster such that equal electric power can be output at a positive output connection of the circuit arrangement and at a negative output connection of the circuit arrangement.

9. The circuit arrangement of claim 1, wherein the balancing device comprises a DC-to-DC converter which is electrically coupled to the positive branch, the negative branch and a first node point of the electrical system.

10. A method for operating a solar inverter of a photovoltaic system, comprising the steps of:
increasing a potential in a positive branch of an intermediate circuit of the photovoltaic system such that a potential of a negative pole of a voltage source takes on a value that is greater than a potential that the negative pole has prior to being increased, or reducing a potential in a negative branch of the intermediate circuit of the photovoltaic system such that an output potential of a positive pole of the voltage source takes on a voltage value that is smaller than a potential that the positive pole has prior to being reduced, and balancing electric power between the positive branch of the intermediate circuit of the electrical system and the negative branch of the intermediate circuit of the electrical system.

11. The method according of claim 10, wherein, in addition, an amount of voltage between the negative and the positive pole of the voltage source of the electrical system is increased or made equal to a mains voltage of a utility grid.

12. The method of claim 10, characterized in that, when the electric power is balanced, the electric power in the positive branch and the negative branch is balanced with respect to a reference potential by means of an inverting adjuster.

13. The method of claim 12, characterized in that the inverting adjuster is controlled such that the same electric power is output at a positive output connection of the circuit arrangement as at a negative output connection of the circuit arrangement.

14. A photovoltaic system, comprising:

an electrical output, a solar inverter for converting and adapting a DC voltage of a voltage source, the solar inverter configured to increase a potential in a positive branch of an intermediate circuit of the photovoltaic system at the electrical output, such that an output potential of a negative pole of the voltage source takes on a value that is greater than a potential that the negative pole has prior to being increased, or it being possible to reduce a potential in a negative branch of the intermediate circuit of the photovoltaic system, such that an output potential of a positive pole of the voltage source takes on a value that is smaller than a potential that the positive pole has prior to being reduced, and a balancing device which is designed to balance electric power between the positive branch of the intermediate circuit of the electrical system and the negative branch of the intermediate circuit of the electrical system during operation of the circuit arrangement.

* * * * *